United States Patent [19]

Miyagi

[11] Patent Number: 4,731,657
[45] Date of Patent: Mar. 15, 1988

[54] CONTROL APPARATUS

[75] Inventor: Ken Miyagi, Yokohama, Japan

[73] Assignee: Canon Kabushiki Kaisha, Tokyo, Japan

[21] Appl. No.: 513,810

[22] Filed: Jul. 14, 1983

[30] Foreign Application Priority Data

Jul. 20, 1982 [JP] Japan .................................. 57-125055

[51] Int. Cl.$^4$ .............................................. H04H 1/04
[52] U.S. Cl. .................................... 358/285; 358/267; 358/293; 318/560; 318/318; 318/270
[58] Field of Search .............. 358/267, 268, 287, 288, 358/293, 285; 318/560, 270, 318

[56] References Cited

U.S. PATENT DOCUMENTS 4,254,439 3/1981 Fowler et al. ...................... 358/267
4,295,167 10/1981 Wiggins ............................. 358/267

Primary Examiner—Edward L. Coles, Sr.
Attorney, Agent, or Firm—Fitzpatrick, Cella, Harper & Scinto

[57] ABSTRACT

An image reader including a control apparatus adapted to control a drive motor such that an image scanner can be moved at a desired speed in its forward stroke and at a higher speed in its backward stroke.

17 Claims, 6 Drawing Figures

CONTROL APPARATUS

BACKGROUND OF THE INVENTION

1. Field of the Invention

The present invention relates to an apparatus for controlling a moving member and others, for example, a control apparatus for an image reader which scans an original, converts the original image into electrical signals by an image sensor and read it.

2. Description of the Prior Art

In the conventional image readers such as copying machines, there is often used a hysteresis or induction motor which is an AC motor. This is because the copying machines require a motor having a sufficiently large torque to read the image of an original and at the same time to drive a photosensitive drum and heat fixation roller used in a process in which the image of the original is transferred to the ordinary paper sheet under the action of charge.

Many AC motors are normally of such a type that is synchronized with an AC frequency used to keep its speed constant. Thus, the synchronized speed can be obtained only at a certain fixed revolution. Even if complicated circuitry is used to change the phase in a drive coil in the range of 2-4 phases, only two synchronized speeds can be obtained. Where the original is copied in reduced and enlarged sizes by using such an AC motor to change the image scanning speed, only two different magnifications can be provided even if the drive phase is changed as described above. If more changes of magnification are required, it is required that a lens system be optically changed in magnification or that the constant revolution of the motor is changed into many desired rotational speeds through a gear box. When it is desired to change the magnification of the lens system, a mechanical construction for positioning the lens system is required, leading to an increase of cost. Further, only a few steps for positioning the lens system can be attained due to mechanical restrictions. The repetitive movement of the lens may result in improper setting positions and images. The gear box may provide only a few steps of change as in the variable power lens system, since the number of gears is geometrically limited. The vibration in the gear box may also contribute to improper images.

There is known a copying machine comprising a fixed platen supporting an original to be copied and a scanner including a source of light for illuminating the original and an optical unit for conducting the light to a photosensitive member. There is also known another copying machine comprising a scanning unit including a movable platen on which an original is placed. Such a scanning unit must be reversed in motion for scanning the image. This requires a reversible motor. Only using such a reversible motor, however, does not enable the direction of scan to be changed because the same motor is also used to drive a photosensitive drum, a fixation section and a system for conveying copy sheets only in one direction. Thus, it has been proposed that the copying machine, have a motor rotable only in one direction, two gear boxes having the respective shafts rotated in different directions and electromagnetic clutches combined with the respective shafts of the gear boxes and used to obtain the desired direction of scan when one of these clutches is engaged. In such an arrangement, means for driving the components other than the scanner is connected with the drive shaft prior to the clutches while the scanner is connected with the drive shaft through the clutches. As a result, the components other than the scanner can be driven always in one direction while the scanner can be changed in its direction of motion. However, the use of two clutches results in various disadvantages, such as increased cost, improper timing due to friction in the clutches, an increased overrun due to the free movement of the final drive shaft during change of one clutch to the other with the resulting increase of scanning period, an improper timing adjustment due to the different frictions in the clutches, and so on.

If more changes of magnification are desired, the number of clutches is correspondingly increased. If the scanner is reciprocated always at the same speed, time is wastefully consumed since the scanner must return to its original position at the same speed as in its forward stroke even when an image is copied in larger sizes. To overcome this problem, a drive system may be further provided to drive the scanner at a higher speed during its return stroke. This leads to an increase of cost. If the clutches are operated over a prolonged period of time, they are degraded, which increases noise and vibrations which will cause improper by formed images.

There has recently been developed a combination of an image reader with a printer in which the image reader is optically separated from, but electrically connected with, the printer. In such a reader, an original is imaged by one on a line sensor of CCD or the like which is one of image pick-up solid state elements, and then scanned in the primary scanning direction to convert the linear image section into signals corresponding to digital values for black and white image portions. Subsequently, the line sensor is moved in the secondary scanning direction for reading the next image line. Since the electrical signals are stored in a memory, the line sensor is no longer required to move in the secondary scanning direction in synchronism with the printer. In this case, a pulse motor is often used which can simply be operated at any synchronized speed in the secondary scanning direction proportional to the number of input pulses. Such a pulse motor is however disadvantageous in that if the rotational speed is increased, the motor does not satisfactorily operate since the starting torque thereof is relatively small in comparison with the geometrical configuration and power consumption of the motor. As a result, the rotation of the motor cannot be increased to any desired speed and/or it may become unstable. Thus, the pulse motor is not suitable for use in the case of driving the line sensor at a higher speed when it is wanted to effect the copying operation at a changed magnification. To satisfactorily actuate the pulse motor causes the efficiency thereof to reduce since a resistor used to drive the motor at lower current consumes more power. In the case that the pulse motor is changed in speed through a gearing, the pulsation of the motor increases noise and vibration. The rotation of the pulse motor does not follow the fluctuation of load to improve the image in accuracy because the pulse motor is only rotated in proportion to the number of input pulses, but not controlled in a closed loop to rotate it in synchronism with the printer.

SUMMARY OF THE INVENTION

It is an object of the present invention to eliminate the above-mentioned disadvantages in the prior art.

Another object of the present invention is to provide a control apparatus for driving a moving member stably.

Still another object of the present invention is to provide a control apparatus for driving a moving member at the desired speed.

A further object of the present invention is to provide an image reader of reduced size and prolonged life, which can provide any desired speed in scanning an image to reduce the time required for scanning and to improve the accuracy with which the image is real A further object of the present invention is to provide a control apparatus of a simple construction which can reciprocate a moving member more accurately and in less time.

DETAILED DESCRIPTION OF THE PREFERRED EMBODIMENTS

The present invention will now be described with reference to an embodiment illustrated in the drawings.

Figure 1:
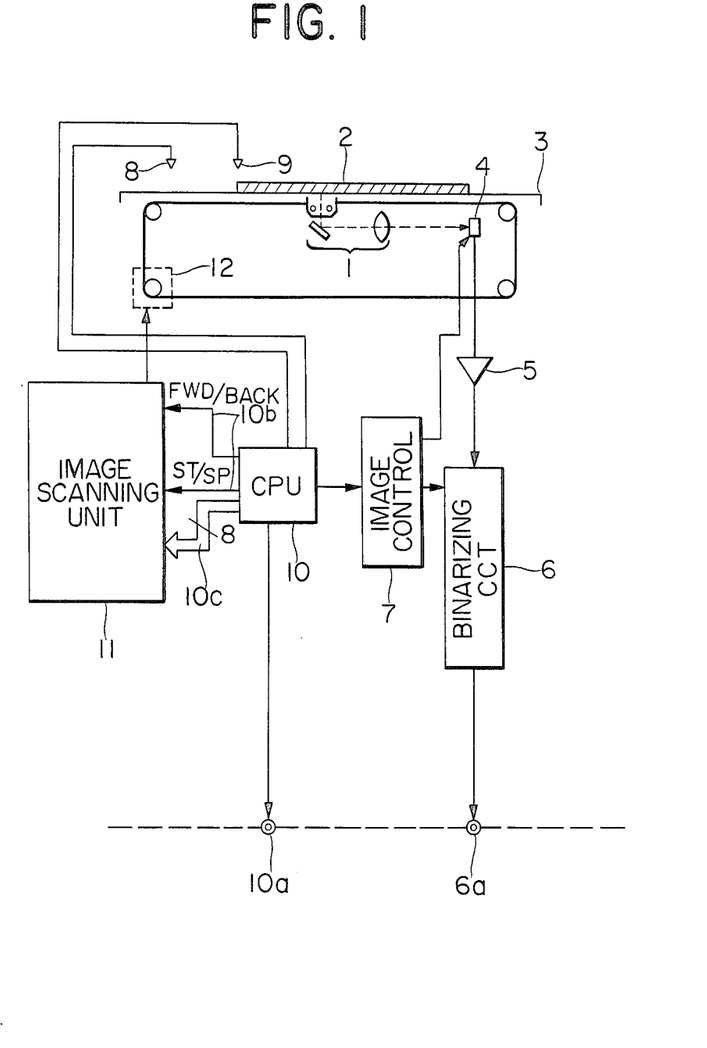
FIG. 1 is a block diagram of the schematic construction of an image reader according to the present invention.

FIG. 1 shows an image reader according to the present invention which comprises a fixed platen 3 on which an original 2 to be copied is placed, and an optical system 1 for scanning and reading the original 2 in the secondary scanning direction, that is, in a direction extending from left to right as viewed in FIG. 1. The original 2 illuminated by the optical system 1 is then imaged on a CCD 4 wherein the image thereof is subsequently read out by read signals to form electrical signals which will in turn be amplified by an amplifier 5 and then converted by a binarizing circuit 6 into "1" (black) and "0" (white). Thus, the binarizing circuit 6 provides image signals at the output terminal 6a thereof. The CCD 4 and binarizing circuit 6 are controlled by an image signal control circuit 7 depending on the characteristics of the CCD element and the necessary resolving power.

The platen 3 is provided with a home position sensor 8 for detecting the home position and a sensor 9 for detecting a leading edge of the image. These sensors have the respective outputs connected with the input of a central processing unit (CPU) 10. The optical system 1 reaches a predetermined speed when it moves to the right from the home position 8 to the leading edge 9 of the image. At this time, CPU 10 provides an instruction to the image signal control circuit 7 for causing it to generate image signals at the output thereof.

CPU 10 serves to integratedly control all the functions of the reader and is connected with a signal circuit the input of which receives a start instruction to the reader, a synchronizing signal circuit for the printer and an external terminal 10a for informing the operating condition of the reader. CPU 10 controls the sequence of the optical system by use of the inputs from the home position sensor 8 and leading edge sensor 9 and is adapted to apply various signals to an image scanning device 11 at the input thereof through signal lines 10b and 10c. The signal line 10b receives a START/STOP signal for starting or stopping a drive motor 12 or FWD/BACK signal for driving the motor forward or backward. The image scanning device 11 receives speed data of 8-bit control signals through the signal line 10c. The speed data determines the scan speed on reading the image and is represented by binary digits. The increase of speed data value decreases the speed. The drive motor 12 for moving the optical system 1 is connected with the image scanning device 11 and is in the form of a DC motor having positive and negative terminals. Thus, the drive motor 12 can be rotated forward or in reverse depending on the direction in which voltage is applied thereto. The opposite end of the drive shaft in the motor includes an encoder which generates pulses in proportion to the revolution of the drive shaft as will be described hereinafter. Upon one full revolution, the encoder provides 80 pulses of square waveform. The encoder includes two output terminals which are respectively in phases A and B different from each other by 90°. In such a manner, the drive motor 12 is energized by the image scanning device 11 to scan the original 2 under the desired conditions in accordance with the speed data applied through the signal line 10c and START/STOP signal applied through the signal line 10b or FWD/BACK signal.

Figure 2:
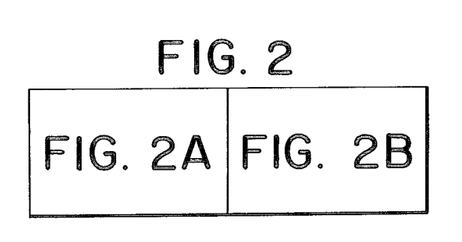
FIG. 2 composed of FIGS. 2A and 2B is a circuit diagram showing the details of the image scanning device shown in FIG. 1.
Figure 2A:
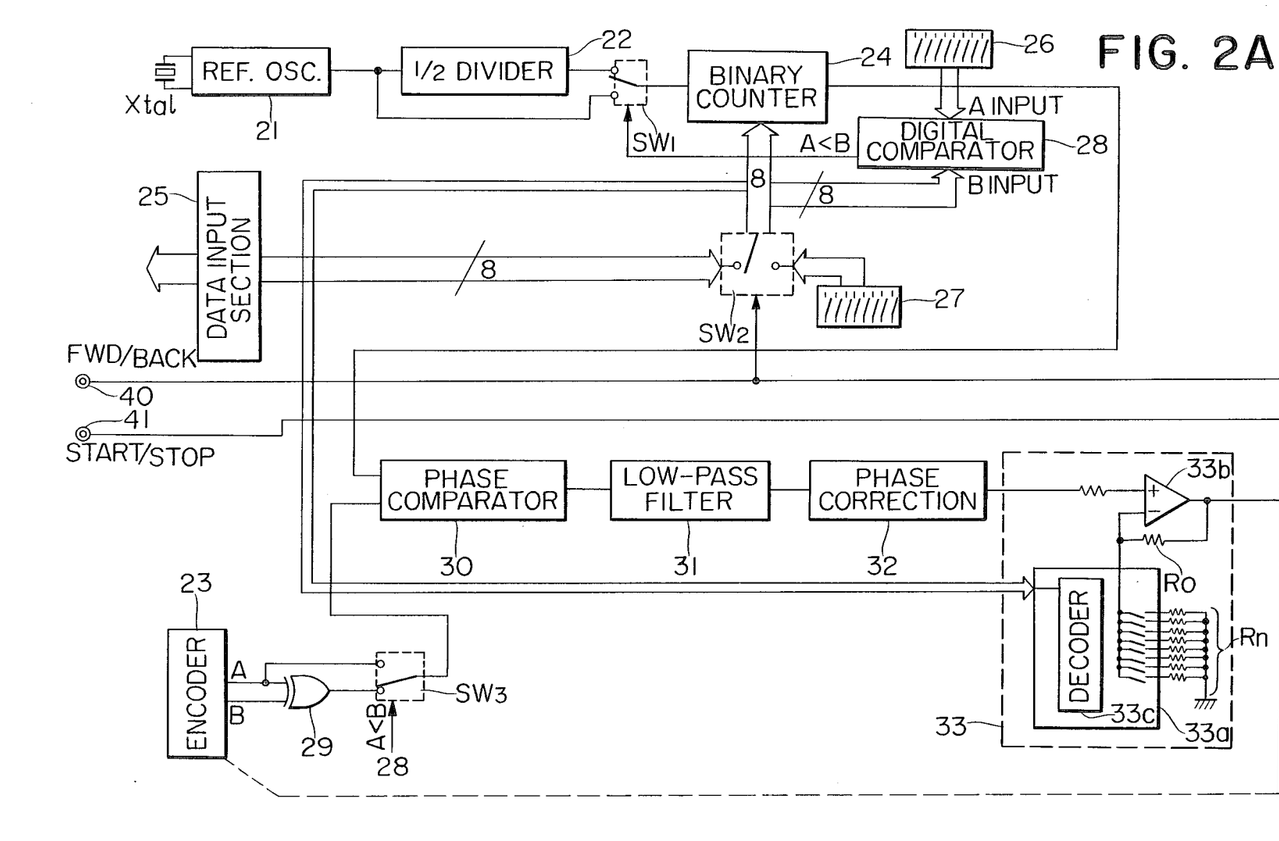
Figure 2B:
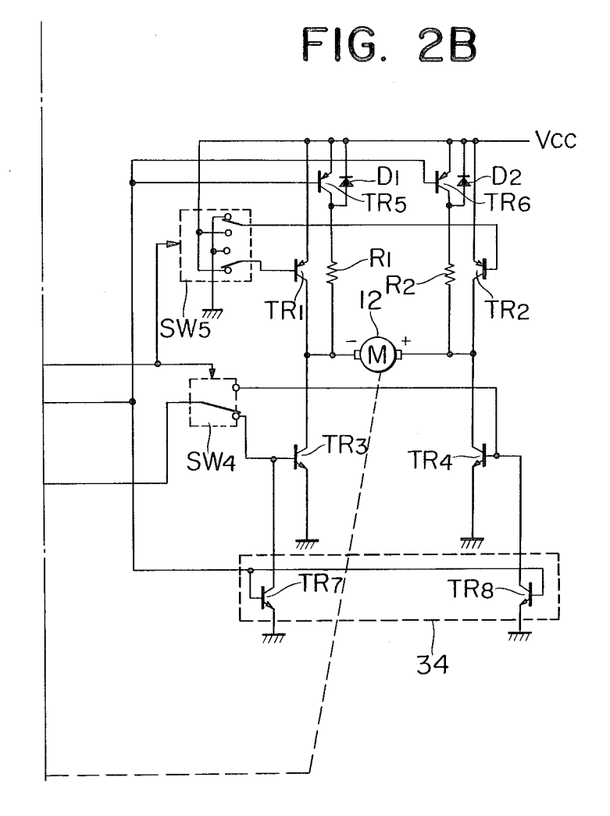

FIG. 2 shows the details of the image scanning device 11 in which a reference oscillator 21 of crystal resonator generates a reference frequency used in setting the revolution of the motor. A signal including this reference frequency is divided to one-half the frequency through a divider 22 and then applied to the input of a binary counter 24 through a switch $SW_1$.

When the switch $SW_1$ is shifted to the opposite position, a signal including non-divided frequency is applied to the input of the binary counter 24. The binary counter 24 is in the form of an 8-bit counter which can set a plurality of dividing steps 1/1-1/256 on external inputs. The number of steps is set by a data input section 25 through a switch $SW_2$. The data input section 25 is connected with the data line 10c shown in FIG. 1 and adapted to divide the frequency from the reference oscillator 21 in accordance with the speed data values set by CPU 10 for providing the desired output frequency at the binary counter 24. In other words, the binary counter 24 serves to divide the frequency of the reference oscillator 21 in accordance with the speed data from the data input section 25. The divided frequency is compared with the output of the encoder 23 with respect to phase in a phase comparator 30 which will be described hereinafter.

Switches $SW_1$ and $SW_3$ are shifted by the output of a digital comparator 28 in which an input A determined by a preset data dial 26 is compared with another input B defined by the data input section 25. A preselected speed datum is stored in the preset data dial 26. The digital comparator 28 compares this stored datum with the data from the data input section 25. The results are used to shift the switches $SW_1$ and $SW_3$.

The encoder 23 which is employed in this embodiment as part of an arrangement to detect what for brevity is termed herein the "driving state" (here the relation between the speed set by dial 28 and instantaneous actual speed of the movable member). is in the form of a pulse generator which detects the revolution of the DC motor 12 to generate two different outputs A and B.

These outputs are connected to one of the input terminals of the switch SW$_3$ through an exclusive OR gate 29. The phase A of the encoder 23 is also connected to the other input terminal of the switch SW$_3$. The switch SW$_3$ is shifted by the output of the digital comparator 28.

The outputs of the switch SW$_3$ and binary counter 24 are respectively connected with the first and second inputs of a phase comparator circuit 30. The phase comparator circuit 30 compares the first and second inputs with respect to phase. If the phase at the first input is ahead of that at the second input, the phase comparator circuit 30 generates an output at "L" level. On the contrary, if the phase at the second input is ahead, an output is generated at "H" level. The outputs generated in the phase comparison are then converted in DC level by a low-pass filter 31. The low-pass filter 31 is connected with a phase correction circuit 32 to prevent the rotation of the motor from oscillating.

Referring again to FIG. 2, the image scanning device 11 further comprises a programmable amplifier 33 consisting of an analog multiplexer 33$a$ and an operational amplifier 33$b$. The programmable amplifier 33 serves to properly control the input signal level of a transistor for driving the motor 12. The amplification factor of the amplifier 33 can vary depending on the value of a resistor which is connected with the output terminal of the analog multiplexer 33$a$. The pulse (+) input of the operational amplifier 33$b$ is connected with the output of the phase correction circuit 32 while the minus (−) input thereof is connected with the output of the multiplexer 33$a$. Therefore, the amplification factor is represented by $R_o/R_n$. The amplification factor is controlled by changing three bits in the data from the data input section into eight steps through a decoder 33$c$. The output of the operational amplifier 33$b$ is connected with the input of a switch SW$_4$. This switch SW$_4$ has one terminal connected with the base of a transistor TR$_3$ for driving the motor and the other terminal connected with the base of a transistor TR$_4$. Thus, the switch SW$_4$ can be shifted by signals from a terminal 40 to which a forward or reversal signal is applied, to change the rotational direction of the motor.

The motor 12 is connected with the midpoint of a bridge circuit consisting of drive transistors TR$_1$–TR$_4$. When a current flows from the plus to minus electrode of the motor 12, it is energized to rotate forwardly to move the scanner from its home position. Each of the transistors TR$_1$ and TR$_2$ is in the form of PNP switching transistor which is turned on if the base input thereof is "L" (low level) and turned off if the base input is "H" (high level). A switch SW$_5$ is provided to shift the base input between high and low levels in accordance with the forward or reverse signal applied to the input terminal 40.

Thus, the motor is energized to rotate in the forward direction when the transistor TR$_2$ is turned on and a drive input is applied to the transistor TR$_3$. On the contrary, the motor is energized to rotate in reverse when the transistor TR$_1$ is turned on and a drive input is applied to the transistor TR$_4$. A stoppage circuit 34 is provided to de-energize the drive motor 12 and comprises transistors TR$_7$ and TR$_8$ having the respective base inputs to which START/STOP signal is applied from a terminal 41.

The circuitry so arranged will now be described with respect to its operation.

When CPU 10 generates a speed data value, a forward (FWD) signal and a starting (START) signal, the switch SW$_2$ is shifted by the FWD signal to provide the speed data value from the data input section 25 to the binary counter 24 which is in turn caused to generate a frequency corresponding to the desired revolution. The FWD signal is also applied to the transistors TR$_2$ and TR$_3$ through the switches SW$_4$ and SW$_5$ so that these transistors will be shifted to drive the motor 12 forward. The starting signal is applied to the terminal 41 to release the stoppage circuit 34.

Figure 3:
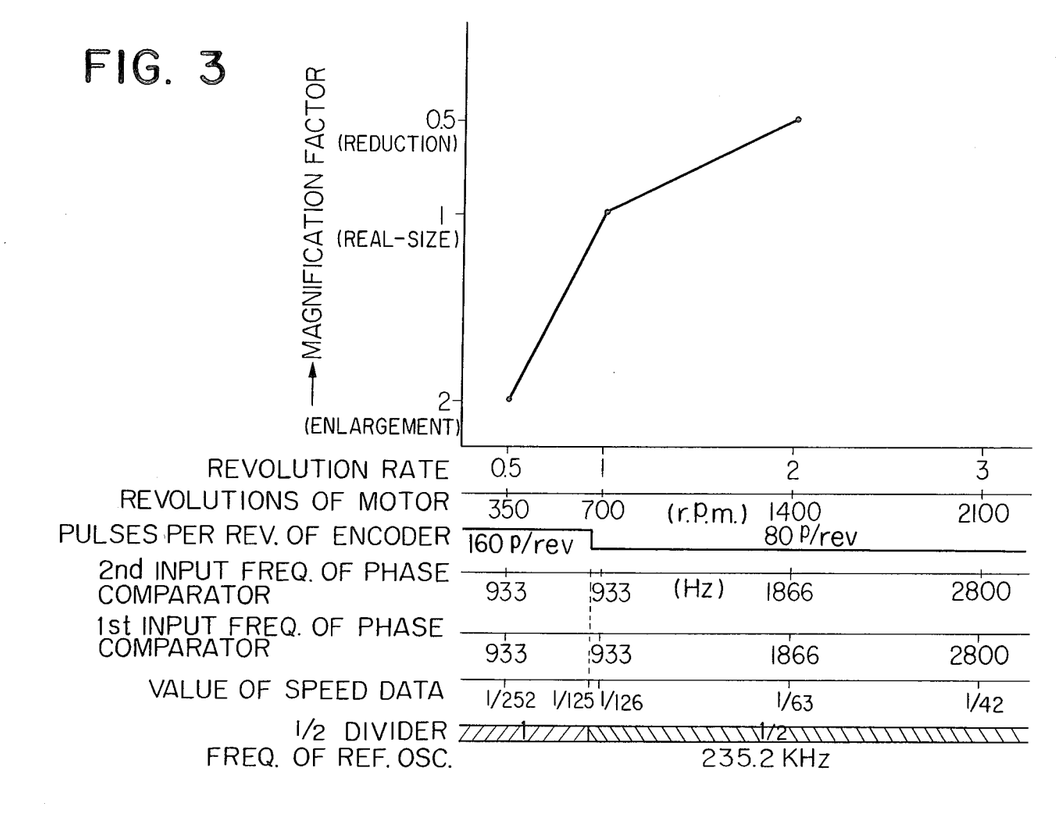
FIG. 3 illustrates reading and scanning operations in accordance with the principle of the present invention.

Referring to FIG. 3, assuming that the speed datum is 126 in decimal value and the reference oscillating frequency is 235.2 KHz, the second input frequency of the phase comparator 30 becomes 933 Hz after passing the dividing circuit 22. On the other hand, the phase comparator 30 is out of phase if the motor starts from its stoppage position, so that the output terminal of the phase comparator will be "H" level. This "H" level drive voltage is then applied to the transistor TR$_3$ to increase the revolution of the motor 12. Since the frequency of the encoder pulse becomes the output of phase A directly to provide 80 p/revolution, the phase comparator 30 continues to generate the "H" level output until the frequency of the first input becomes 933 Hz. As the revolution of the motor becomes 700 r.p.m. that is, the frequency of the first input becomes 933 (Hz) =700 (r.p.m.)/60×80 (p/rev.) the output of the phase comparator 30 is reduced to "L" level. The phase comparator 30 repeats this cycle to maintain the revolution of the motor at a value set by the speed data value.

Since the forward revolution of the motor 12 is proportional to the speed data value, the revolution of the motor 12 can freely be changed to read an image in any magnificantion of enlarged and reduced sizes if CPU 10 provides any value up to 256 to the speed data output line. For example, if it is desired to obtain an image of 0.5 times the size of an original, the revolution of the motor may be increased to twice the normal speed, that is, 1400 r.p.m. to increase the scan speed. In such a case, the frequency of the encoder becomes 1866 Hz. If a divider dividing the reference frequency to 1/63 is set to to the binary counter 24, the phase comparator 30 will have the first and second inputs equal to each other to maintain the motor 12 at 1400 r.p.m.

If CPU 10 detects the completion of forward movement of the image scanner, the CPU 10 generates at the output a stopping (STOP) signal and a reverse (BACK) signal. Further, CPU 10 begins to count (starts a timer contained therein) immediately as the optical system 1 is detected by the leading edge sensor 9. If a predetermined count is terminated in the CPU 10, it is judged that the image scanning operation has completed. Therefore, the CPU 10 generates a stoppage signal. The count may suitably be changed depending on the magnification used and the size of the original. The pulses from the encoder may be counted to detect the completion of the image scan. The stoppage signal energizes the stoppage circuit 34 to short the base input of the transistor TR$_3$ so that the drive signal will be cut off to stop the motor 12. The stoppage of the motor 12 decreases vibration produced in reversal. The reverse signal is applied to the binary counter 24 through the switch SW$_2$ to shift the input of the binary counter 24 to the preset data dial 27. The preset data dial 27 includes a speed data used to move the image scanner in its return stroke at a speed which is determined by this speed data. The reverse signal also shifts the switches SW$_4$ and SW$_5$ such that the transistor TR$_1$ is turned on and a drive signal is applied to the base input of the transistor TR$_4$. Thus, the motor 12 is energized to rotate inverse. After the motor 12 has stopped, CPU 10 again generates a starting signal to release the stoppage circuit 34 so that the motor can be energized to rotate in reverse. In the reverse rotation of the motor, the speed thereof is maintained constant by the output of the preset data dial 27. Thus, the data input of the CPU 10 is not required since it does not influence the reverse rotation of the motor. For example, assuming that the image scanner is returned to its original position at a speed of three times the normal speed in real size copy (the revolution of the motor is 700 r.p.m.) in the embodiment shown in FIG. 3, the revolution of the motor would be increased to 2100 r.p.m. with the necessary frequency of 2800 Hz. The value to be preset at the preset data dial 27 would be 1/42.

As described hereinbefore, CPU 10 generates a data value for determining the speed of the image scanner in its forward stroke, a forward signal for rotating the drive motor forwardly, a starting signal for initiating the image scan in the forward movement of the image scanner, a stoppage signal for temporarily stopping the motor, a reversal signal for initiating the reversal movement of the motor and for determining the speed of the image scanner in its return stroke and another starting signal for moving the image scanner to its original position. If a plurality of copies is wanted, the above operation is repeated.

When the optical system is moving to scan in its return stroke, CPU 10 stops the optical system and then causes the same to shift to the next image scanning in the forward stroke of the optical system if there is any output of the home position sensor 8.

As shown in FIG. 2, the respective electrodes of the motor 12 are connected with the transistors TR$_5$ and TR$_6$. The respective emitters of these transistors TR$_5$ and TR$_6$ are connected with a common source of plus voltage while the collectors thereof are connected with the respective electrodes of the motor 12 through resistors R$_1$ and R$_2$, respectively. Diodes D$_1$ or D$_2$ is reversely connected between the collector and emitter of the respective transistor to bias the reverse bias current of that transistor. The base input of each of the transistor TR$_5$ and TR$_6$ receives a stoppage signal from the terminal 41 and then becomes "L" level. At this time, the transistors TR$_3$ and TR$_4$ are turned off to place the electrodes of the motor in their free states. However, a closed loop will be defined by the field winding of the motor 12, the transistor TR$_5$, the resistors R$_1$ and R$_2$, the transistor TR$_6$ and the diodes D$_1$, D$_2$. Therefore, any field system is hard to produce due to the movement of the rotor in the motor as if the motor is mechanically braked. Thus, the movable parts of the optical system shown in FIG. 1 can firmly fixed in their rest positions so that the change of stroke from its forward direction to its reverse direction will be effected for a reduced period of time. The resistor R$_1$ serves to control the current flowing this braking circuit so that if the resistor is decreased in value, the rest time of the optical system is increased. If desired, however, the resistor R$_1$ may be omitted.

Figure 4A:
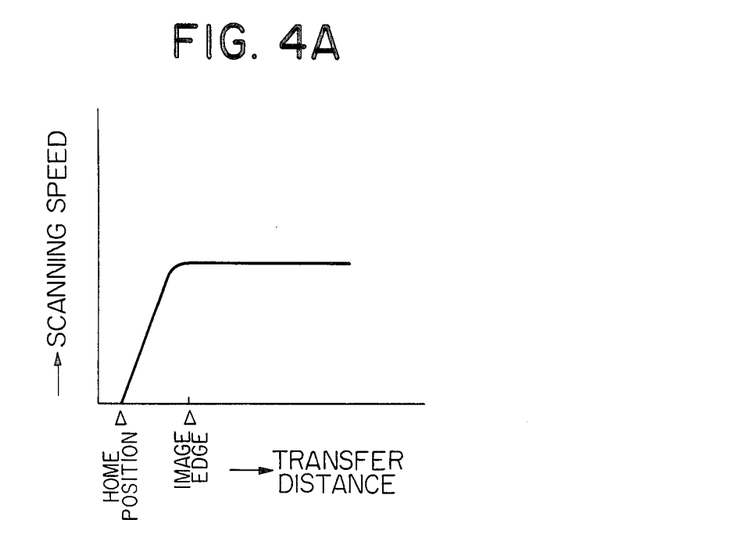
FIGS. 4A and 4B are graphs showing the rise in scan speed when an image is being scanned.
Figure 4B:
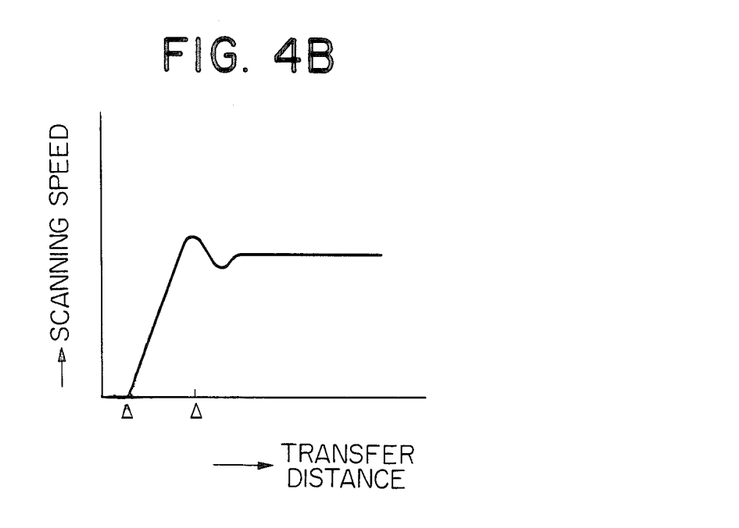

On reading the original, the distance between the home position and the leading edge of the original may be set sufficiently to make the revolution of the motor stable as shown in FIG. 4A. It is preferred that this distance is reduced. Since the revolution of the motor is changed up to four times the normal value, however, the motor may be overdriven even if the revolution thereof is set at lower speed when the motor is maintained at its constant driven condition for a higher speed. Thus, the image scanner will not reach a constant speed even if it moves to the leading edge of the original to cause a vibration as shown in FIG. 4B. As a result, the leading edge of the original will be imaged improperly. Thus, the programmable amplifier 33 is provided to overcome such a problem. As described hereinbefore, this amplifier 33 includes the decoder 33 which has three input lines and is adapted to use three bits to combine eight resistors R$_n$ for setting the gain of the amplifier. The input lines of the decoder 33 are respectively connected with three of high order bits in the binary counter 24. If the resistors R$_n$ are set to increase in value as the value in the binary counter is increased, the gain thereof is reduced at lower speed to provide smaller drive signal. On the contrary, the gain of the programmable amplifier is increased at higher speed to provide larger drive signal. Therefore, a stable characteristic as shown in FIG. 4A can be obtained under all the scanning conditions.

When the magnification is increased, the revolution of the motor will be reduced. At this time, the frequency of the encoder also is reduced not to smoothen the rotation of the motor. This is because the motor is reduced in inertia while at the same time the motor will not finely be controlled since the resolving power of the encoder is unvariable. It is therefore preferred that the resolving power of the encoder can be increased at lower speed. For this purpose, the switch SW$_3$ is shifted to obtain more outputs of the encoder. Thus, the input B of the digital comparator 28 is adapted to receive the value of the binary counter 24 while the input A thereof is adapted to change the number of pulses in the encoder. In other words, the input A of the digital comparator 28 receives a predetermined value from the data dial 26. If the input A is set at 125 in the embodiment shown in FIG. 3, the output A becomes smaller than the output B when the speed data value 252 corresponding to a lower revolution is applied to the input B. As a result, a signal of "H" level is applied to the switch SW$_3$ which in turn is shifted to provide the rotation pulses of the encoder equal to 160 pulses/revolution to the output of the exclusive OR gate 29. At the same time, the switch SW$_1$ is also shifted to provide an oscillating frequency directly from the output of the reference oscillator 21. Thus, the second input of the phase comparator 30 receives a signal having a frequency of 933 Hz while the first input thereof receives a pulse signal of 933 Hz from the encoder in spite of the lower revolution of the motor (350 r.p.m.) if the motor is stable.

As described hereinbefore, the present invention utilizes a reversible DC motor for driving the image scanner to scan an original in its forward and return strokes and for changing the image scanner in speed in accordance with external set instructions in the forward stroke to read the original in various magnifications. Therefore, the scanning speed can be changed substantially in a stepless manner to increase the range of magnification rate and can be remotely controlled by CPU.

The use of DC motor can provide its fully synchronized and accurate revolutions in all the speeds. Therefore, the motor can be reduced in size and provide images with better accuracy. Further, the motor can easily be changed with respect to its direction of rotation only by changing electrical signals without any instability. As a result, time required on scanning can be reduced to read the original at higher speeds. The optimum rise condition may be set in connection with speeds on scanning in varied magnifications so that any improper image can be eliminated.

In the illustrated embodiment, CCD 4 reads the image of the original only in the forward stroke of the image scanner. If the CCD 4 reads the image even in the return stroke of the image scanner, however, time required to copy a plurality of sheets continuously can be reduced in all the magnifications. At this case, the speed in the return stroke is set at the same speed as in the forward stroke of the image scanner. Where the scanning is effected in the forward stroke at a speed corresponding to any varied magnification and carried out in the return stroke at a constant speed (the possible maximum speed or more) as described hereinbefore, data for the image of the original which is read in the return stroke may be used to determine the density in the original without copying. Background of average signal of the original obtained by such a determination may be used as a threshold data for the binarising operation in the binarising circuit 6. Thus, a copy of better contrast or proper density may automatically be obtained.

The scanning operation in the return stroke may be terminated by braking the optical system 1 when its home position is detected by the sensor. Alternatively, the reference frequency applied to the phase comparator 30 may gradually be reduced to cause the optical system 1 to reach its home position smoothly when the optical system 1 is detected by the leading edge sensor 9. This can be accomplished by causing the CPU 10 to successively changing the values in the preset data dial 27 shown in FIG. 2, for example. Thus, the vibration produced when the optical system is stopped may be reduced. It is useful particularly when the optical system is moved at higher speeds. The frequency applied to the phase comparator 30 may gradually be reduced when a predetermined time has passed from the initiation of scanning in the return stroke.

Although the illustrated embodiment has been described as to cause the CPU 10 to control the timing of scan in the optical system 1, the timing of scan may be controlled by any other sequence hard circuit.

Although the illustrated embodiment has been described as to apply speed data from the CPU 10 to the data input section 25, an operator may manually operate a control board (not shown) to set the resulting values directly at the binary counter 24 without the passage of CPU 10.

The present invention is not intended to limit to the illustrated embodiment and may be modified in various forms without departing from the scope of the invention defined in claims.

What I claim is:

1. A control apparatus comprising:
   drive means for driving a movable member;
   setting means for setting the movable member at a predetermined speed;
   detection means for detecting a driving state of said drive means and for generating a detection signal in accordance with the driving state of said drive means, wherein said detection means comprises an encoder and changes the number of pulses in the detection signal generated for each revolution of said encoder in accordance with the speed set by said setting means;
   reference signal generating means for generating a plurality of reference signals having respective different frequencies, said reference signal generating means selecting one of the reference signals in accordance with the speed set by said setting means; and
   control means for controlling said drive means in accordance with the selected reference signal and the detection signal of said detection means so as to drive the movable member at the speed set by said setting means.

2. A control apparatus as defined in claim 1, wherein said control means is adapted to control said drive means to move the movable member in a forward direction and a backward direction.

3. A control apparatus as defined in claim 2, wherein said controlling means is adapted to control said drive means in accordance with said selected reference signal and the detection signal of said detection means when said movable member is moved in the forward direction, and in accordance with a predetermined said reference signal and the detection signal of said detecting means when said movable member is moved in the backward direction.

4. A control apparatus as defined in claim 2, wherein said controlling means includes electrical means for stopping said drive means on termination of of said movable member in the forward direction.

5. A control apparatus as defined in claim 2, wherein said movable member includes means for reading an original image.

6. A control apparatus as defined in claim 1, wherein said control means changes a factor of amplification of a signal applied to said drive means in accordance with the speed set by said setting means.

7. A control apparatus as defined in claim 1, wherein said drive means has a DC motor, and wherein said detection means generates pulses of said encoder in accordance with the speed set by said as said detection signal.

8. A control apparatus comprising:
   drive means for moving a movable member in a forward direction and a backward direction, said drive means including a motor;
   detection means for detecting a driving state of said drive means and for generating a detection signal in accordance with the driving state of said drive means;
   setting means for setting the movable member at a predetermined speed;
   reference signal generating means for generating a plurality of reference signals having respective different frequencies, said reference signal generating means selecting one of the reference signals in accordance with the speed set by said setting means; and
   control means for controlling said drive means in accordance with the selected reference signal and the detection signal when the movable member is moved in the forward direction and in accordance with a predetermined one of said reference signals and the detection signal when the movable member is moved in the backward direction.
   wherein said control means is adapted to control said drive means so that the movable member is moved at a higher speed in the backward direction than in the forward direction, and wherein said control means includes means for electrically stopping the movable member upon completion of movement of the movable member in the forward direction by short-circuiting the motor, and for controlling said drive means to move the movable member in the backward direction after the stopping of the movable member.

9. A control apparatus as defined in claim 8, wherein said detection means changes a mode for generation of the detection signal in accordance with the speed set by said setting means.

10. A control apparatus as defined in claim 9, wherein said drive means has a DC motor, and wherein said detection means comprises an encoder and changes the number of pulses in said detection signals generated for each revolution of an encoder in accordance with the speed set by said setting means.

11. A control apparatus as defined in claim 8, wherein said control means changes a factor of amplification of a signal applied to said drive means in accordance with the speed set by said setting means.

12. A control apparatus as defined in claim 8, wherein said movable member includes means for reading an original image.

13. A control apparatus comprising:
drive means for moving a movable member in a forward direction and a backward direction;
means for setting the movable member at a predetermined speed for movement in the forward direction; and
control means adapted to apply a drive signal to said drive means in accordance with the speed set by said setting means,
wherein said control means comprises a plurality of amplifying means having respective different amplification factors and selects one of said amplifying means to vary the amplification of the drive signal applied to said drive means in accordance with the speed set by said setting means.

14. A control apparatus as defined in claim 13, further comprising means for generating a plurality of reference signals having respective different frequencies, each of said reference signals being selected by said setting means, and means for detecting a driving state of said drive means; wherein said control means is adapted to control said drive means in accordance with the output of said detection means and the reference signal set by said setting means so as to move the movable member in the forward direction at the speed set by said setting means.

15. A control apparatus as defined in claim 14, wherein said drive means has a DC motor, and wherein said detection means comprises an encoder and changes the number of pulses in said detection signal generated for each revolution of said encoder in accordance with the speed set by said setting means.

16. A control apparatus as defined in claim 13, wherein said movable member includes means for reading an original image.

17. A control apparatus comprising;
drive means for moving a movable member in a forward direction and a backward direction;
means for setting the movable member at a predetermined speed for movement in the forward direction;
control means adapted to apply a drive signal to said drive means in accordance with the speed set by said setting means, said control means changing an amplification factor of the drive signal applied to said drive means in accordance with the speed set by said setting means;
means for generating a plurality of reference signals each of which is selected by said setting means, and means for detecting a driving state of said drive means; wherein said control means is adapted to control said drive means in accordance with the output of said detection means and the reference signal set by said setting means so as to move the movable member in the forward direction at the speed set by said setting means; and
means for generating another reference signal to set the movable member at a second predetermined speed for movement in the backward direction.
wherein said controlling means is adapted to control said drive means in accordance with the output of said detecting means and the other reference signal so that the movable member is moved at a higher speed in the backward direction than in the forward direction.

* * * * *

UNITED STATES PATENT AND TRADEMARK OFFICE
CERTIFICATE OF CORRECTION

PATENT NO. : 4,731,657  
DATED : March 15, 1988  
INVENTOR(S) : KEN MIYAGI

Page 1 of 3

It is certified that error appears in the above-identified patent and that said Letters Patent is hereby corrected as shown below:

COLUMN 1

Line 10, "read" should read --reads--.  
    Line 57, "changed" should read --changed,--.  
    Line 61, "machine," should read --machine--.  
    Line 61, "rotable" should read --rotatable--.

COLUMN 2

Line 24, "improper by" should read --improperly--.  
    Line 30, "one on" should read --one line on--.

COLUMN 3

Line 11, "real" should read --read.--.

COLUMN 4

Line 62, "encoder 23" should read --encoder 23,--.  
    Line 66, "member)." should read --member),--.

COLUMN 5

Line 16, "converted in" should read --converted to--.  
    Line 28, "pulse (+)" should read --plus (+)--.

COLUMN 6

Line 35, "magnificantion" should read --magnification--.

UNITED STATES PATENT AND TRADEMARK OFFICE
CERTIFICATE OF CORRECTION

PATENT NO. : 4,731,657

DATED : March 15, 1988

INVENTOR(S) : KEN MIYAGI

It is certified that error appears in the above-identified patent and that said Letters Patent is hereby corrected as shown below:

COLUMN 7

Line 3, "inverse." should read --in reverse.--.
    Line 56, "can" should read --can be--.

COLUMN 8

Line 11, "decoder 33" should read --decoder 33c--.
    Line 14, "decoder 33" should read --decoder 33c--.

COLUMN 9

Line 34, "changing" should read --change--.
    Line 52, "limit" should read --be limited--.
    Line 55, "claims." should read --the claims.--.

COLUMN 10

Line 17, "controlling" should read --control--.
    Line 26, "controlling" should read --control--.
    Line 27, "of of" should read --of the moment of--.
    Line 38, "of said encoder in" should be deleted.
    Line 39, "accordance with the speed set by said" should be deleted.
    Line 64, "direction." should read --direction,--.

UNITED STATES PATENT AND TRADEMARK OFFICE
CERTIFICATE OF CORRECTION

PATENT NO. : 4,731,657                        Page 3 of 3
DATED      : March 15, 1988
INVENTOR(S): KEN MIYAGI It is certified that error appears in the above-identified patent and that said Letters Patent is hereby corrected as shown below:

COLUMN 12

Line 39, "controlling" should read --control--.

Signed and Sealed this

Sixteenth Day of August, 1988

Attest:

DONALD J. QUIGG

Attesting Officer      Commissioner of Patents and Trademarks